(No Model.) 3 Sheets—Sheet 1.
H. C. SERGEANT.
VALVE FOR RECIPROCATING ENGINES.
No. 422,095. Patented Feb. 25, 1890.
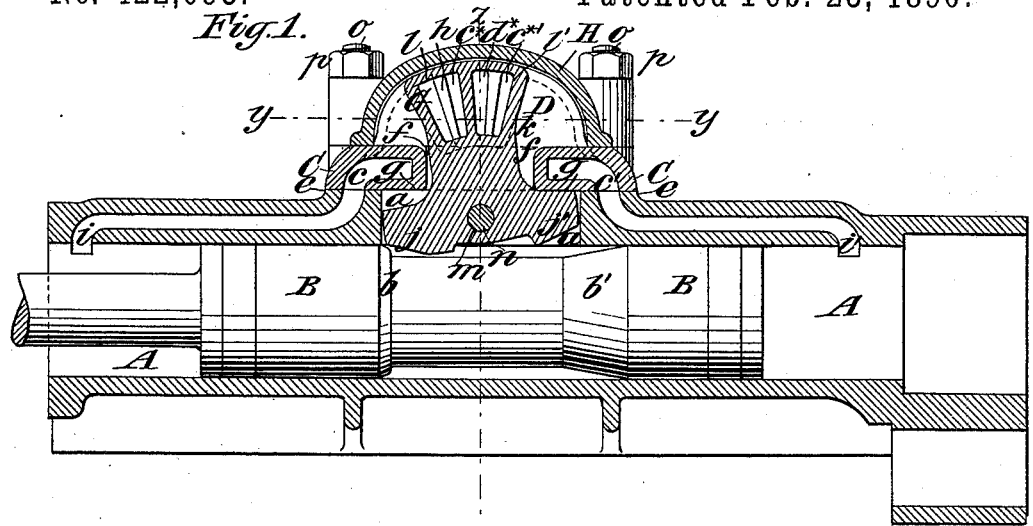
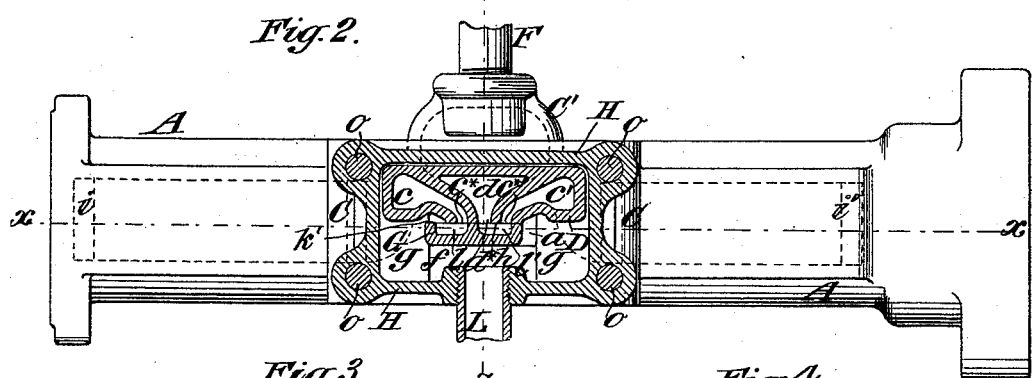
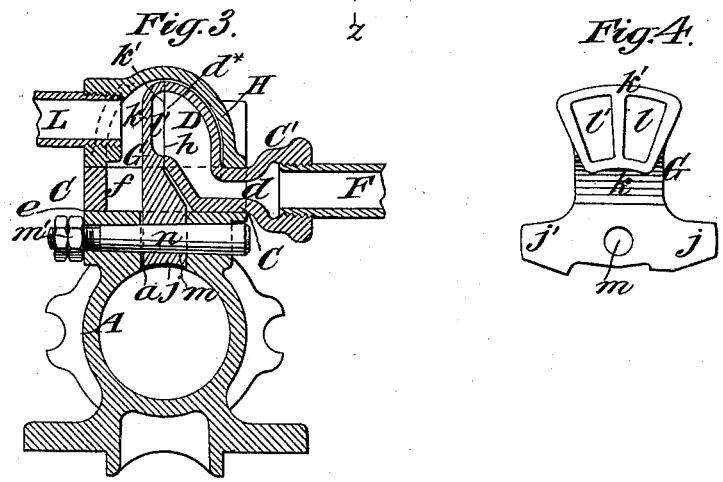
Witnesses:
O. Lundgren
John Bickel
Inventor:
Henry C. Sergeant
by attorneys
Brown & Griswold (No Model.) 3 Sheets—Sheet 2.

H. C. SERGEANT.
VALVE FOR RECIPROCATING ENGINES.

No. 422,095. Patented Feb. 25, 1890.

Witnesses:
C. Sundgren
[signature]

Inventor:
Henry C. Sergeant
by attorneys
[signature]

(No Model.) 3 Sheets—Sheet 3.
H. C. SERGEANT.
VALVE FOR RECIPROCATING ENGINES.

No. 422,095. Patented Feb. 25, 1890.

Witnesses:

Inventor.

UNITED STATES PATENT OFFICE.

HENRY C. SERGEANT, OF NEW YORK, N. Y.

VALVE FOR RECIPROCATING ENGINES.

SPECIFICATION forming part of Letters Patent No. 422,095, dated February 25, 1890.

Application filed May 9, 1889. Serial No. 310,111. (No model.)

*To all whom it may concern:*

Be it known that I, HENRY C. SERGEANT, of the city, county, and State of New York, have invented a new and useful Improvement in Valves for Reciprocating Engines, of which the following is a specification, reference being had to the accompanying drawings.

This invention relates to that class of valves for reciprocating engines which are actuated by the engine-piston striking or working in contact with tappets which are provided on the valve and which project into the cylinder.

I will now proceed to describe my invention with reference to the accompanying drawings, and afterward point out its novel features in the claims.

Figure 5:
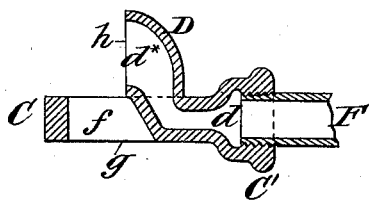
Figure 6:
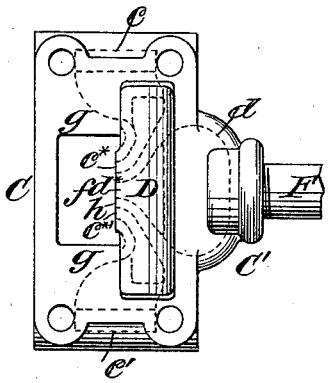
Figure 7:
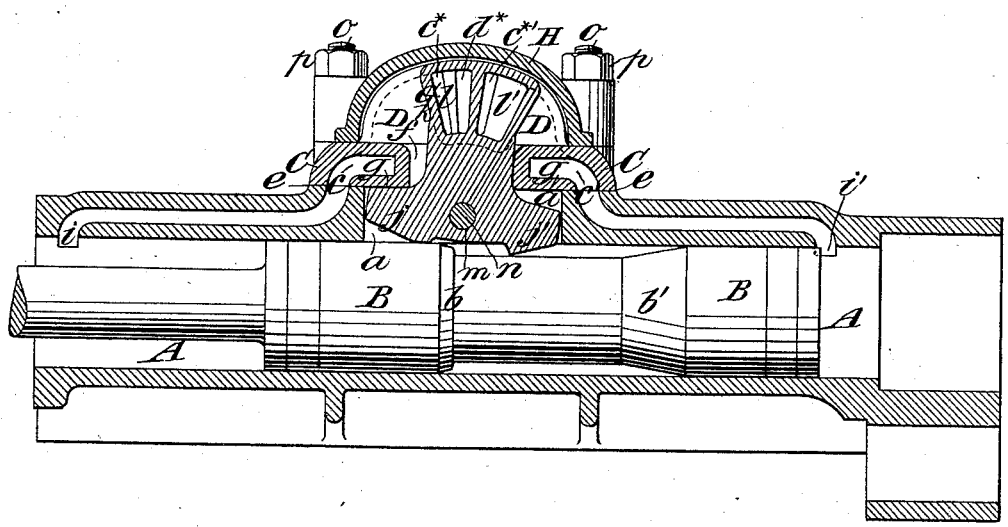

Figure 1 represents a longitudinal sectional view of the cylinder, piston, and valve of an engine embodying my invention, the section being taken on the line $x\ x$ of Fig. 2. Fig. 2 is a plan view, with the valve, valve-seat plate, and the steam-chest cover in section in the line $y\ y$ of Fig. 1. Fig. 3 represents a transverse section in the line $z\ z$ of Figs. 1 and 2. Fig. 4 represents a face view of the valve. Fig. 5 represents a transverse section of what is hereinafter called the "seat-plate," detached from the engine; and Fig. 6 is a plan view of the same. Fig. 7 is a view corresponding with Fig. 1, showing the piston and valve in a different position.

Similar letters of reference designate corresponding parts in all the figures.

A designates the cylinder, having a longitudinal parallel-sided opening $a$ about midway between its ends to contain the valve-tappets.

B is the piston, which is reduced in size between the ends to produce two inclined surfaces or shoulders $b\ b'$, which face each other for acting upon the valve-tappets.

C D designate what I term the "seat-plate," the form of which is angular in its transverse section, as shown in Figs. 3 and 5, and which is cored out to form passages $c$, $c'$, and $d$ for the steam or other motive fluid by which the engine is actuated. The part C of this seat-plate, which constitutes a flat base, is fitted to a corresponding face $e$ on the cylinder surrounding the opening $a$ in the latter, and it has in it an opening $f$, which may be of any suitable width, but the length of which is less than that of the opening $a$, as shown at $g\ g$ in Fig. 1, to constitute the tappet-stops, as hereinafter more fully explained. The part D of the said seat-plate projects from the base C perpendicularly thereto to form a flat valve-face $h$, which is approximately radial to the axis of the cylinder A, as may be understood by reference to Fig. 3. The passages $c$, $c'$, and $d$ terminate in ports $c^*$, $c^{*\prime}$, and $d^*$ in the face $h$, and the passages $c\ c'$ communicate with corresponding passages $i\ i'$ leading to opposite ends of the cylinder. The arrangement of the ports $c^*\ c^{*\prime}$ is the same as in many well-known D slide-valve seats. The passage $d$ opens through the side of the base C, as shown in Fig. 3, and has connected with it the exhaust-pipe F, the portion of the base containing the said passage $d$ being extended laterally, as shown at C' in Figs. 2, 3, and 6, for the purpose of facilitating the making of said connection.

G designates the slide-valve, which in its profile, as seen in Figs. 1 and 4, is of substantially the form of an inverted letter T, having wings $j$, $j'$, and $k$. The two wings $j\ j'$, which are opposite or nearly in line with each other, constitute tappets, and the wing $k$, which is arranged centrally between the wings $j\ j'$ and has a flat face $k'$, constitutes the valve proper, the said face having in it two cavities $l\ l'$ properly proportioned to the ports $c^*\ c^{*\prime}$ in the valve-seat to constitute a double-D valve. The lower part of this valve, which is flat and constitutes the tappets $j\ j'$, fits easily in the opening $a$ in the cylinder, as may be understood by reference to Figs. 1 and 3, and the tappets project under or beyond the stops $g\ g$, as shown in Fig. 1, while the valve-face $k'$ is in contact with the seat $h$. The valve is held in place by means of a pin $n$, which passes through a circular opening $m$, provided centrally in the valve at the junction of the wings $j\ j'\ k$ and through corresponding openings in the cylinder on opposite sides of the opening $a$. The said pin constitutes the pivot on which the valve oscillates, and is secured in place by nuts $m'$. The valve is held to its seat $h$ by pressure of the motive fluid on its back.

H designates the cover, which combines with the base C of the seat-plate to constitute the chest, which receives through the pipe L from the boiler or reservoir the steam, air, or other fluid by which the engine is to be driven. This cover conforms to the lateral profile of the base C, as may be understood by comparison of Figs. 2 and 6, so that the same stud-bolts $o$ and nuts $p$ may secure both together and to the cylinder, and afford easy access to the valve and seat by simply taking off the nuts $p$ and lifting off the cover H. The valve thus constructed and applied is moved in one direction and the other alternately across the seat $h$ by the action of the facing inclined surfaces or shoulders $b\ b'$ on the piston upon the tappets $j\ j'$ to admit steam or other motive fluid to the cylinder at opposite ends alternately, and is stopped in either direction by one of the stops $g\ g$, which are outside of the tappets.

In Figs. 1 and 2 of the drawings the cylinder is supposed to be taking steam through the left-hand port $c^*$, the steam entering under that part of the D cavity $l$ which projects beyond the seat, and the exhaust to be taking place from the right-hand end through the D cavity $l'$ from the port $c^{*'}$ to the port $d^*$, and the piston is moving to the right. As the piston proceeds in its stroke, its inclined surface or shoulder $b$ throws the valve over to the reverse position shown in Fig. 7. After completing the movement of the valve in either direction the inclined surface or shoulder $b$ or $b'$, which has operated upon it, passes by the tappet, and the other portion of the piston, which fits the cylinder, passes under or behind the tappet and holds it to the stop $g$, against which it has been brought, and so prevents any recoil of the valve being produced by the tappet striking the stop in the rapid working of the piston. The valve is in this way locked between the piston and the stop $g$ during the completion of the movement of the piston in either direction and during the first part of its return movement.

In order that the face-wing $k$ of the valve may be made of sufficient length greater than that of the tappet-wings to permit a desirable length of movement of the valve on its seat without its being liable to acquire an objectionable amount of momentum in the rapid movement which is necessary for the valves of direct-action reciprocating engines, for most purposes, it is desirable that the said wing $k$ should be made as light as possible; yet it is desirable that the tappets should have all the strength and breadth of bearing possible. To thus lighten the face wing and yet obtain a desirable width of tappet-face, I make the wing $k$ thinner or narrower than the tappet-wings in a direction parallel with the axis of oscillation of the valve. As shown in Fig. 3, the face-wing $k$ is only half the width of the tappet-wings. This proportion brings the valve-face central to the width of the tappets.

What I claim as my invention, and desire to secure by Letters Patent, is—

1. The combination, with the cylinder of a reciprocating engine having a longitudinal opening for valve-tappets, and a piston in said cylinder having inclined surfaces or shoulders which face each other, of a valve having tappets which enter said opening, and fixed stops outside of said tappets against which the said tappets are held by the piston when the valve has completed its movement in either direction, substantially as herein set forth.

2. The combination, with the cylinder of a reciprocating engine having in it a longitudinal opening for valve-tappets, of an oscillating valve having its face approximately radial to the axis of said cylinder, and having tappets situated within said opening, and a seat-plate for said valve partly covering said opening, and the tappets within it to constitute stops for the tappets to control the movement of the valve, substantially as herein set forth.

3. The combination, with the cylinder having the tappet-opening $a$, the angular seat-plate C D, having the opening $f$ opposite the said tappet-opening $a$, but partly overlapping said opening to form tappet-stops $g\ g$, and the oscillating valve G, having its axis of oscillation within said tappet-opening, having tappets $j\ j'$ behind the so-formed stops, and having its face $k$ perpendicular to its axis of oscillation, and projecting through the said opening $f$ in the seat-plate and in contact with the corresponding seat $h$ on said plate, substantially as herein set forth.

4. The three-winged oscillating tappet-valve having one wing, which constitutes the valve-face, narrower or thinner in a direction parallel with the axis of oscillation than the other two wings, which constitute the tappets, substantially as and for the purpose herein set forth.

HENRY C. SERGEANT.

Witnesses:
 FREDK. HAYNES,
 C. E. SUNDGREN.